Nov. 6, 1962 J. L. CHADWICK 3,062,616
CONVERSION OF METAL CHLORIDE TO THE CORRESPONDING METAL NITRATE
Filed Jan. 14, 1960 2 Sheets-Sheet 1

Legend
A- REACTOR
B- CONCENTRATOR
C- CRYSTALLIZER
D- COOLER
E- CENTRIFUGE
F- OXIDIZER
G- CHLORINE STILL INVENTOR.
John L. Chadwick
BY Sweedler and Zucker

United States Patent Office 3,062,616
Patented Nov. 6, 1962

3,062,616
CONVERSION OF METAL CHLORIDE TO THE CORRESPONDING METAL NITRATE
John L. Chadwick, Richardson, Tex., assignor to Delhi-Taylor Oil Corporation, Dallas, Tex., a corporation of Delaware
Filed Jan. 14, 1960, Ser. No. 2,539
10 Claims. (Cl. 23—102)

This invention relates to the conversion of alkali metal and alkaline earth metal chlorides (particularly potassium chloride) to the corresponding alkali and alkaline earth metal nitrates.

Potassium nitrate, as is well known, is useful as a fertilizer, a constituent of mixed fertilizers, and as a raw material in many processes. This invention will hereinafter be described in connection with the conversion of potassium chloride to potassium nitrate, but it will be understood it is not limited thereto and includes the conversion of other alkali metal chlorides, such as sodium, and alkaline earth metal chlorides, such as calcium, to the corresponding nitrates.

The reaction of potassium chloride with nitric acid to produce potassium nitrate, nitrogen dioxide $$(2NO_2 \rightleftharpoons N_2O_4)$$

nitrosyl chloride and chlorine; the oxidation of nitrosyl chloride to produce nitrogen dioxide and chlorine; the separation of the nitrogen dioxide from the chlorine, and the reaction of nitrogen dioxide thus separated with potassium chloride in the presence of nitric acid or water and oxygen to produce nitric acid for use in the process has been suggested.

As heretofore proposed, such procedures were carried out in equipment of an involved and complicated character requiring, in addition to the reactor in which the reaction between the potassium chloride and nitric acid is carried out, separate equipment for effecting the separation of the nitrogen dioxide from the chlorine and equipment of relatively large capacity to produce a unit quantity of potassium nitrate product because prior known procedures required the handling of relatively large volumes of liquids and gases to produce such unit quantity of potassium nitrate.

It is among the objects of the present invention to provide a process of converting potassium chloride to potassium nitrate which can be carried out employing readily available inexpensive nitric acid, e.g., commercial nitric acid having a concentration of from 55% to 70% by weight or crude unbleached nitric acid containing oxides of nitrogen, and this without requiring the handling of excessive quantities of water, thus permiting the process to be carried out in compact equipment, and effecting economies in connection with the nitric acid employed in the process.

Another object of this invention is to provide such process in which less acid is required for the production of a unit quantity of potassium nitrate than in heretofore known procedures.

Still another object of this invention is to provide such process in which separation and purification of the chlorine product is accomplished with less investment cost for a given purity of chlorine product.

Still another object of the present invention is to provide such process which effects marked economies in the equipment required for the oxidation of the nitrosyl chloride produced in the process and for the conversion of the nitrogen dioxide to nitric acid or nitrate.

Still another object of this invention is to provide such process which results in the production of acid liquors of such a character as to minimize corrosion problems in the handling thereof, particularly in the crystallizer and equipment associated therewith for effecting separation of the potassium nitrate crystals from the mother liquor.

Other objects and advantages of this invention will be apparent from the following detailed description thereof taken in connection with the accompanying drawings in which.

Figure 1:
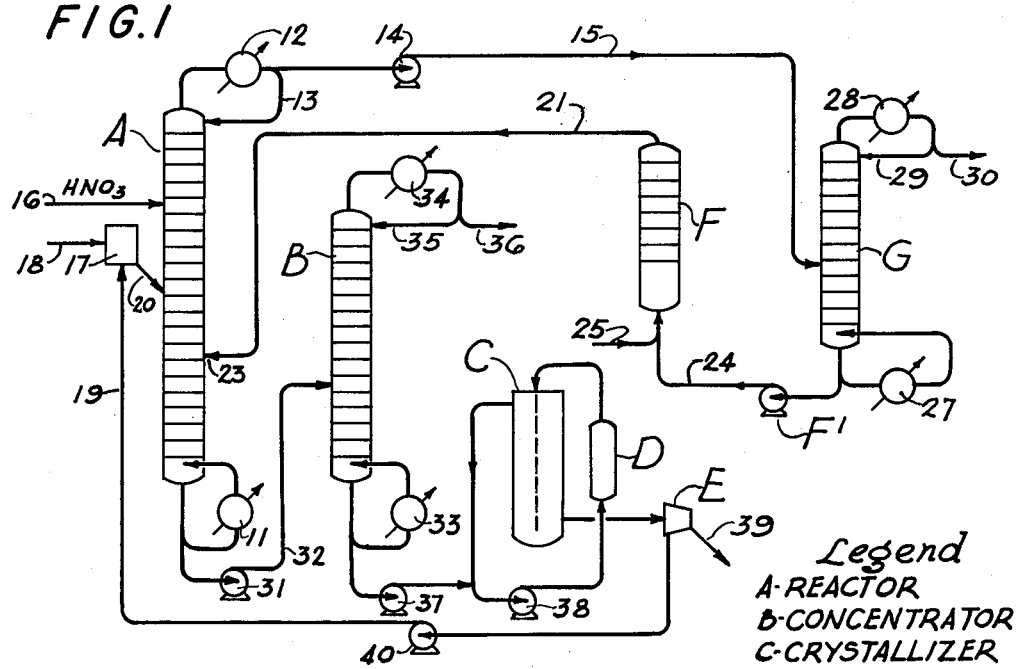
FIGURE 1 is a diagrammatic layout of the equipment for practicing one embodiment of the invention.

The process of this invention involves carrying out the reaction in a distillation column reactor in which the reaction mixture is maintained at its boiling point in the base of the column and the temperature within the column is maintained in a descending temperature gradient from bottom to top, the top temperature being such that substantially all of the nitrogen dioxide produced in the reaction between the potassium chloride and the nitric acid, is consumed within the column. Such top temperature is maintained by (a) introducing, as reflux, enough of the liquid mixture of chlorine and nitrosyl chloride produced by condensing the overhead vapors withdrawn from the column, and (b) having enough distillation trays in the upper portion of the column (i.e., above the point of introduction of the nitric acid), to condense substantially all of the nitrogen dioxide vapors in the vapor mixture at the top of the column, where the vapor mixture is removed therefrom, to thus minimize the amount of nitrogen dioxide going off overhead. The vapor mixture taken off overhead, consisting chiefly of nitrosyl chloride and chlorine, is condensed; a portion of the condensate is returned as reflux and the remainder oxidizezd to convert the nitrosyl chloride to nitrogen dioxide and chlorine. The nitrogen dioxide may be and preferably is recycled to the reactor where it is beneficially utilized in the process, thus reducing the amount of fresh nitric acid fed to the reactor.

The crude potassium chloride is introduced into this reactor where the temperature is between 5° C. and 60° C. Nitric acid of 55% to 70% by weight concentration, which can be any commercially available inexpensive nitric acid, such as commonly available 58% to 68% grade or crude unbleached nitric acid containing oxides of nitrogen, is fed to the column above the point of introduction of the crude potassium chloride and preferably at a point where the temperature within the column does not exceed 5° C., preferably within the range of from 5° C. to —5° C. The fresh nitric acid and potassium chloride are introduced into the column in molar proportions ranging from 1 mol of nitric acid per mol of potassium chloride to approximately 1.4 mols nitric acid per mol of potassium chloride depending upon the amount, if any, of nitrogen dioxide withdrawn from the process. If none is withdrawn, i.e., if all of the nitrogen dioxide is recycled and converted to the metal nitrate, then the molar ratio of these two feed components should be 1. Introduced with the crude potassium chloride is a recycle stream of nitric acid containing dissolved salts but having, on a salt-free basis, from 50% to 65% by weight of nitric acid to maintain the concentration of nitric acid in the lower portion of the column at a level such that maximum yields of potassium nitrate result.

The reaction mixture is withdrawn from the base of the reactor column, concentrated to effect removal of water and potassium nitrate crystallized from the concentrated reaction mixture. The potassium nitrate crystals are separated from the mother liquor and the latter recycled to the column reactor.

In the modification of the invention involving recycle of the nitrogen dioxide stream through the reactor, this nitrogen dioxide stream, which may contain some chlorine and/or nitrosyl chloride, is introduced into the column at a point below the point of introduction of the fresh nitric acid.

In the embodiment of the invention not involving recycle of a nitrogen dioxide stream through the reactor column, the temperature at the top of the column is maintained within the range of from −10° C. to −15° C. This temperature of from −10° C. to −15° C. at the top of the column also prevails when a nitrogen dioxide and chlorine stream produced by the oxidation of nitrosyl chloride and containing relatively large amounts of chlorine is recycled through the reactor column. In the preferred embodiment, involving recycle of nitrogen dioxide which contains little or no chlorine, the temperature at the top of the column is maintained within the range of from −5° C. to −11° C.

In both modifications, the ratio of reflux to the net liquid product, consisting chiefly of nitrosyl chloride and chlorine taken off overhead from the reactor column, can be varied from 0.5 to 3.0 as desired.

The point of introduction of the nitric acid is such that at least 3, preferably from 3 to 5, theoretical plates or distillation trays are positioned between the point of introduction of the crude potassium chloride and the point of introduction of the nitric acid. At least 4, preferably from 4 to 8, theoretical plates or distillation trays are positioned between the point of introduction of the nitric acid and the point at or near the top of the column where the reflux liquid is introduced into the column. From 5 to 10, preferably 8, theoretical plates or distillation trays are disposed in the column between the point of introduction of the mixture of crude potassium chloride and recycle stream of nitric acid and the base of the column.

By having the number of distillation trays above the fresh acid feed point, as hereinabove disclosed and by feeding reflux within the range hereinabove disclosed, the temperature at the top of the column, i.e., at the point where the reflux is introduced (hereinafter referred to as top temperature), is maintained within the ranges hereinabove given, namely, from −10° C. to −15° C., when practicing the embodiment of the invention in which no stream of nitrogen dioxide is recycled through the reactor, or this recycle stream, as in FIGURE 1, contains large amounts of chlorine, e.g., about 40% by weight and from −5° C. to −11° C. when practicing the embodiment of this invention involving the recycle of a nitrogen dioxide stream which may contain small amounts of chlorine and/or nitrosyl chloride. Operating under these conditions, little or no nitrogen dioxide goes off overhead from the reactor. Thus when practicing the embodiment of the invention shown in FIGURE 1 in which the recycle nitrogen dioxide stream contains about 40% by weight of chlorine, or when operating with no recycle of nitrogen dioxide through the reactor, when this top temperature is −10° C., the overhead liquid product contains 4.3 weight percent nitrogen dioxide; when this top temperature is −13° C., the overhead liquid product contains 1.3 weight percent nitrogen dioxide; and when this top temperature is −15° C., the overhead liquid product contains esesntially no nitrogen dioxide. When practicing the embodiment of the invention shown in FIGURE 2 involving recycle of a nitrogen dioxide stream containing little or no chlorine and/or nitrosyl chloride through the reactor column, when the top temperature is −8° C., the liquid overhead product contains 3.6 weight percent of nitrogen dioxide, and when the top temperature is −11° C., the liquid overhead product contains essentially no nitrogen dioxide.

Thus, in the present invention, the potassium chloride reactor accomplishes the following functions:

(1) Substantially all of the nitrogen dioxide formed in the reactions within the column is maintained within the column; little or none goes off overhead. This is accomplished by (a) maintaining the top temperature within the temperature ranges hereinabove given, (b) returning reflux within the range hereinabove disclosed, and (c) having enough distillation trays in the upper portion of the column above the point of fresh nitric acid feed to the column, i.e., the number of trays hereinabove disclosed. Hence, the potassium chloride reaction column functions to effect separation of the bulk if not all of the nitrogen dioxide from the nitrosyl chloride and chlorine. The nitrogen dioxide is maintained in the column; most of the nitrogen dioxide rises no further than between the fresh nitric acid feed point and the point where the reflux is introduced into the column.

(2) Traces of moisture entrained in the vapors within the column are removed so that the vapors leaving the top of the column are free of moisture. Above the fresh acid feed point, two liquid layers are produced, one consisting of an aqueous phase containing nitric acid formed in part by reaction of nitrogen dioxide and water in the column, and the other a liquid phase containing principally nitrogen dioxide. As the vapors rise through this portion of the column, the last traces of moisture entrained in the vapors are removed. The aqueous phase acts as a sponge to remove any moisture fog contained in the vapors.

(3) The acid strength is held high, even though weak acid is fed to the column, with consequent improvement in the conversion of potassium chloride to potassium nitrate. The nitrogen dioxide vapors produced in the reaction with the potassium chloride and that introduced in the column below the feed point for the crude potassium chloride and recycle nitric acid stream, in rising through the column, are condensed and mix with the aqueous phase, effecting concentration of the incoming nitric acid and the nitric acid in the recycle stream. In this portion of the column, i.e., between the point of introduction of the nitrogen dioxide and the point of introduction of the fresh acid feed, where the temperature ranges from about 100° C. to −5° C., the following reactions take place:

(1) $4HNO_3 + 3KCl = 3KNO_3 + NOCl + Cl_2 + 2H_2O$
(2) $4HNO_3 + 2KCl = 2KNO_3 + 2NO_2 + Cl_2 + 2H_2O$
(3) $N_2O_4 + KCl = NOCl + KNO_3$
(4) $3NO_2 + H_2O + \frac{1}{2}Cl_2 = NOCl + 2HNO_3$ The nitric acid reacts with the potassium chloride to produce potassium nitrate, nitrosyl chloride, chlorine, nitrogen dioxide and water. Concurrently, the nitrogen dioxide reacts with the potassium chloride to produce nitrosyl chloride and potassium nitrate. Also, nitrogen dioxide reacts with chloride to produce nitric acid and nitrosyl chloride. Accordingly, due to the reaction represented by equation number 4, the acid strength is held high even though weak acid is fed to the column.

(4) Chlorides are stripped from the reaction mixture removed as bottoms. The base of the column under the conditions hereinabove described serves to convert substantially all of the chlorides to nitrosyl chloride and chlorine. The reaction mixture removed as bottoms contains for all practical purposes little or no chloride. Hence, the corrosion problems entailed in the concentration and crystallization of potassium nitrate from this reaction mixture are minimized.

In FIGURE 1 of the drawings, A is a distillation column provided with a boiler 11 at its base. A condenser 12 is arranged to receive the vapor stream coming off from the top of distillation column A. The condensate from condenser 12 is divided into two streams, one of which is returned as reflux through line 13 and the other pumped by pump 14 through line 15 into the chlorine still G. Fresh nitric acid is supplied to the reactor A through line 16. Potassium chloride feed is supplied to a slurry mixer 17 through line 18. The mother liquor or recycle acid is supplied to mixer 17 through line 19. The resultant slurry enters reactor A through line 20.

A line 21 leads from the oxidizer F and enters the column A at 23.

The reaction mixture is maintained at its boiling point at the base of column A. When the column is operated under atmospheric pressure conditions, the boiling point of the reaction mixture is about 117° C. The nitrogen dioxide and the chlorine produced in the oxidizer F enter column A at point 23 where the temperature is about 80° C. The mixture of crude potassium chloride and mother liquor enters the reactor column A where the temperature is about 25° C. The fresh nitric acid enters at 16 where the temperature is about —5° C. At the top of the column, in the modification of FIGURE 1, the temperature is from about —10° C. to —15° C., preferably about —14° C.

The oxidizer F, in the modification of FIGURE 1, is connected with the chlorine still G by line 24. The oxidizer F is supplied with oxygen through line 25. This oxidizer effects oxidation of the nitrosyl chloride in the liquid phase with co-current flow of oxygen and the liquid nitrosyl chloride through column F containing at least 3 contact stages under a pressure of from 200 to 675 p.s.i.g. In the first contact stage the temperature is maintained within the range of from 60° C. to 80° C. and in the final contact stage the temperature is maintained within the range of from 75° C. to 120° C.

Using high purity oxygen in oxidizer F, as shown diagrammatically in the drawings, in amount less than that required to oxidize all of the nitrosyl chloride, the effluent mixture of liquid and vapor does not have to be condensed and separated before being introduced into the reactor A. The actual temperatures in the oxidizer F are within the range of from 80° to 120° C. and the pressure within the oxidizer varies from 225 to 675 p.s.i.g. Operating at lower temperatures within this temperature range correspondingly lower pressures, within the pressure range, are used. Thus at 80° C. the oxidizer pressure will be 225 p.s.i.g. and at 120° C. the pressure will be 675 p.s.i.g.

One advantage of using oxygen as compared with air is that the total effluent liquid and vapor mixture from the oxidizer can be fed either directly into the reactor or into a distillation column to remove the chlorine as overhead product Air, instead of high purity oxygen, may however be used in oxidizing the nitrosyl chloride to chlorine and nitrogen dioxide. If air is used, the nitrogen and unconsumed oxygen are separated from the reaction mixture by subjecting it to a temperature low enough to condense nitrogen dioxide, separating the liquid product from the uncondensed nitrogen and oxygen containing some chlorine and subjecting the gas from this step to conventional absorption means for recovery of the chlorine contained in this inert gas stream. When using air instead of high purity oxygen, the oxidizer pressures will vary from 460 to 915 p.s.i.g. and the outlet temperature from 80° C. to 100° C., with higher outlet temperatures when operating under the higher pressures and lower outlet temperatures when operating at the lower pressures. Thus, at 80° C. outlet temperature, the pressure within the oxidizer is 460 p.s.i.g. and at 100° C. outlet temperature, the pressure within the oxidizer is 900 p.s.i.g.

When using high purity oxygen, as shown in FIGURE 1 of the drawings, the liquid and vapor product mixture passes from the oxidizer F through line 21 and enters reaction column A at 23

Chlorine still G effects separation of chlorine from the other gaseous products with which it is admixed. This still is provided with a boiler 27 at its base and a condenser 28 at its top. The condensate from this condenser is divided into two streams. One stream is returned as reflux through line 29; the other is removed as chlorine product through line 30.

Reaction mixture is continually withdrawn from the base of column A by pump 31 and pumped thereby through line 32 which leads to a concentrator B desirably in the form of a distillation column provided with a boiler 33 at its base and a condenser 34 at its top. This column is operated to drive off water from the reaction mixture. Water vapor is condensed in condenser 34 and the condensate divided into two streams, one of which is returned as reflux through line 35 and the other discharged to waste through line 36. Condenser 34 may be of the direct contact spray type.

The concentrated reaction mixture is pumped by pump 37 into crystallizer C. Supernatant liquid flows from crystallizer C into and through pump 38 through cooler D, admixing with the concentrated reaction mixture. In this manner the concentrated reaction mixture is cooled to about 40° C. This temperature will vary with each locality, depending upon the temperature of the available cooling water.

From the base of crystallizer C the slurry flows through centrifuge E. Potassium nitrate crystals are removed through line 39. Mother liquor is pumped by pump 40 into the slurry mixer 17 through line 19.

Figure 2:
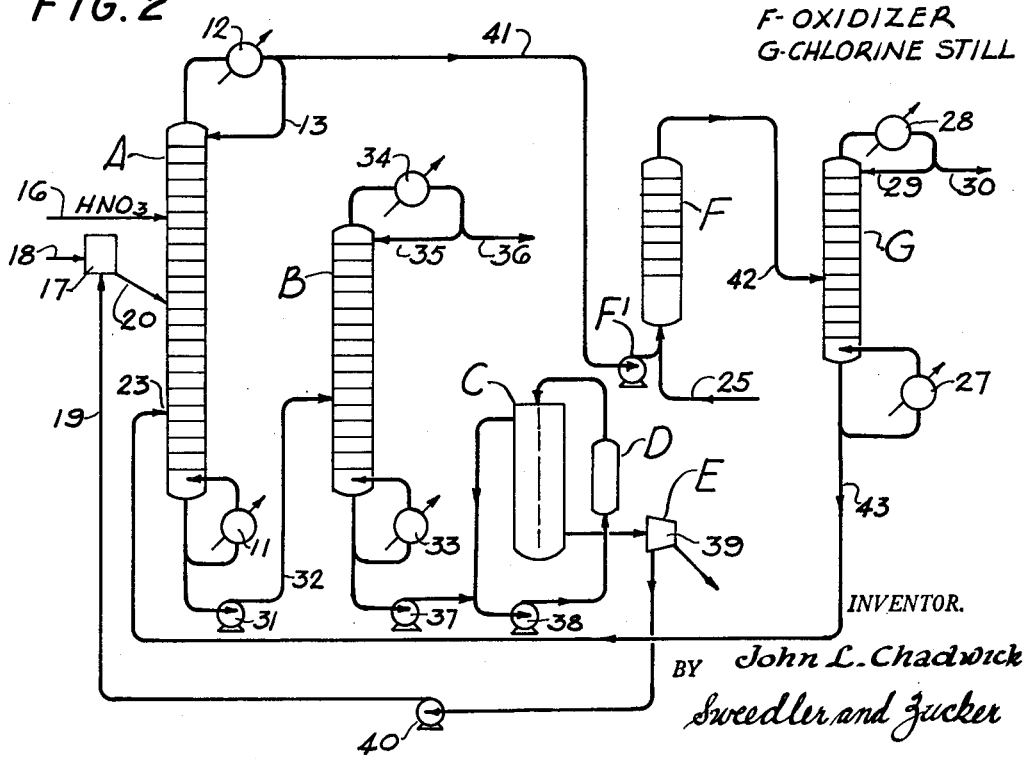
FIGURE 2 is a diagrammatic layout of the equipment for practicing another embodiment of the invention.

The modification of FIGURE 2 differs from FIGURE 1 chiefly in that the overhead from the reactor A flows through line 41 into the oxidizer F from which the liquid products of oxidation, consisting of chlorine, nitrogen dioxide and a small amount of nitrosyl chloride, flow through line 42 into the chlorine still G. The nitrogen dioxide stream, containing a small amount of nitrosyl chloride, is removed as bottoms from the chlorine still and is passed continuously through line 43 which enters reactor A at point 23.

In general, in the operation of the modification shown in FIGURE 2, the temperatures between the point of introduction of fresh nitric acid and the point of introduction of reflux at or near the top of the column will be somewhat higher (warmer) than the corresponding temperatures in the operation of FIGURE 1. This difference in temperature is due to the fact that little chlorine is circulated through the reactor A from the oxidizer F in the operation of FIGURE 2 as compared to the relatively large quantity of chlorine (of the order of about 40% of the total weight of this recycle nitrogen dioxide stream) recirculated through the reactor in the modification of FIGURE 1. This difference in the composition of the vapors leaving the top of the reactor A is responsible for the different top temperatures in these two modifications of the present invention. The difference in temperature is of the order of about —4° C.; thus when the top temperature in FIGURE 1 is —10° C., the top temperature in FIGURE 2 is —14° C.

Figure 3:
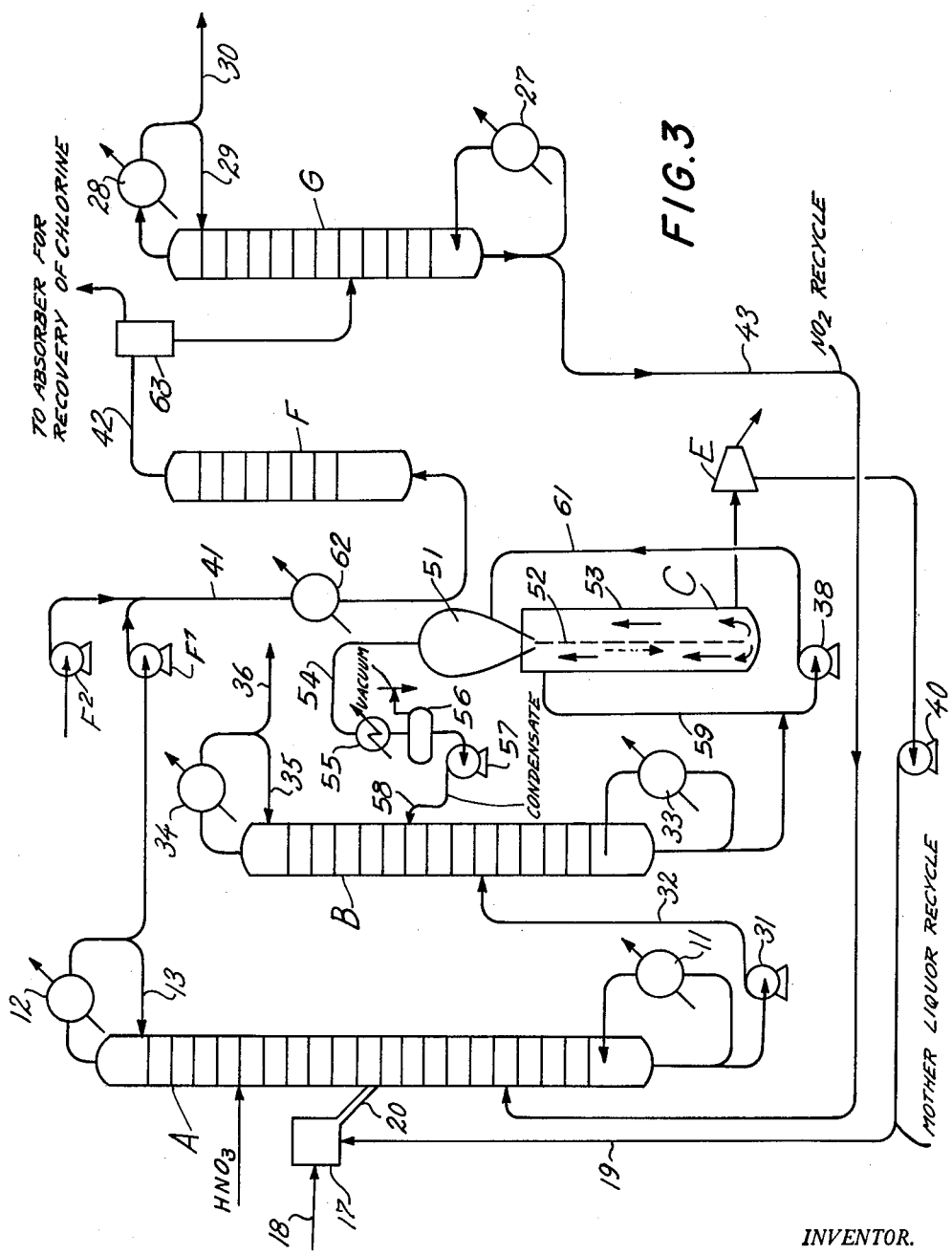
FIGURE 3 is a diagrammatic layout of the equipment for practicing still another embodiment of the invention.

The modification of FIGURE 3 differs from that of FIGURE 2 chiefly in that an evaporative type crystallizer is used instead of a heat exchanger to effect the reduction of the temperature in the crystallizer C. In FIGURE 3, 51 indicates a flash chamber communicating with the conduit 52 within the crystallizer C, which conduit leads to a point near the base of chamber 53 containing a bed of crystals, not shown. Flash chamber 51 communicates through conduit 54 with a condenser 55 which in turn communicates with a tank 56. Tank 56 is connected to a vacuum pump to maintain the crystallizer chamber 53, flash chamber 51, condenser 55 and tank 56 under vacuum. Pump 57 pumps condensate from tank 56 through line 58 into the concentrator B. The suction side of circulating pump 38 communicates with the upper portion of the crystallizing chamber 53 through a line 59 and discharges the liquid thus withdrawn from the crystallizing chamber 53 into the flash chamber 51 through line 61.

A portion of the reaction mixture introduced into flash chamber 51 by pump 38 is boiled off or vaporized, thereby effecting the necessary cooling to effect crystallization of the potassium nitrate. The material thus boiled off is chiefly nitric acid which is condensed in condenser 55 and the condensate pumped into the concentrator B from tank 56. The nitric acid thus boiled off is recycled from the concentrator B to the crystallizer C.

In operation, pump 38 pumps the material withdrawn from the upper portion of the crystallizing chamber 53 into the flash chamber 51 where the material is cooled by evaporation. The cooled material gravitates to the base of the crystallizing chamber 53 through line 52 and then flows up through the bed of crystals to the suction line 59 of pump 38. Small crystals remain in suspension in chamber 53 and grow in size. The large crystals which settle at the base of chamber 53 are discharged into the centrifuge E.

As noted, vapors in flash chamber 51 are condensed by condenser 55 under vacuum and the condensate pumped into the concentrator B.

In the modification of FIGURE 3, air pumped by pump $F^2$ mixes with the feed to oxidizer F. The mixture passes through a preheater 62 in line 41 leading to the oxidizer F. Line 42 leading from the oxidizer F passes into a separator 63 where the separation of nitrogen and unreacted oxygen from the liquid oxidized reaction mixture takes place. Liquid reaction mixture from separator 63 consisting chiefly of chlorine and nitrogen dioxide is introduced into the still G where it is fractionated to separate the chlorine from the nitrogen dioxide as in the modification of FIGURE 2.

In all modifications, a pump F' pumps the feed into the oxidizer F to maintain the desired superatmospheric pressure conditions therein.

The following examples are given for purposes of illustrating the invention. It will be understood the invention is not limited to these examples. In these examples, all pound values are pounds per hour, percentages are on a weight basis, and temperatures are in ° C.

*Example I*

This example is carried out in equipment of the type shown in FIGURE 1.

127.5 pounds of 67 weight percent nitric acid, consisting of 85.4 pounds nitric acid and 42.1 pounds water, are introduced at a point in column A where the temperature is —5° C. 100 pounds of crude potassium chloride, consisting of approximately 97% potassium chloride, 3% sodium chloride and traces of impurities are introduced into slurry mixer 17. Also introduced into this mixer is the recycle mother liquor stream in amount of 390 pounds consisting of 134 pounds nitric acid, 109.6 pounds water, 39 pounds sodium nitrate and 107.4 pounds potassium nitrate. This mixture enters column A at a point in this column where the temperature is 25° C.

207.8 pounds of a mixture consisting of 101.6 pounds chlorine, 98.4 pounds nitrosyl chloride and 1.4 pounds nitrogen dioxide is taken off overhead from reactor A. This vapor mixture is condensed and divided into two equal streams, one of which is returned as reflux at the top of the column where the temperature is —14° C. The other stream in amount of 100.9 pounds consisting of 50.8 pounds chlorine, 49.4 pounds nitrosyl chloride and 0.7 pound nitrogen dioxide is introduced into the chlorine still G. 48.0 pounds chlorine are taken off overhead from the still. The bottoms in amount of 52.9 pounds consisting of 49.4 pounds nitrosyl chloride, 2.8 pounds chlorine, and 0.7 pound nitrogen dioxide is introduced into the base of the oxidizer F under a pressure of 390 p.s.i.g. and at a temperature of 100° C. at its top. High purity oxygen in amount of 11.1 pounds containing 10.9 pounds oxygen and 0.2 pound nitrogen is introduced at the base of the oxidizer F. There is taken off overhead from the oxidizer 64.1 pounds consisting of 31.9 pounds nitrogen dioxide, 5.1 pounds nitrosyl chloride, 26.9 pounds chlorine, 0.2 pound nitrogen and 0.1 pound oxygen. This mixture, mostly vapor, is introduced into reactor A at a point where the temperature is about 80° C.

Reaction mixture bottoms in amount of 580.1 pounds consisting of 134 pounds nitric acid, 163.8 pounds water, 43.3 pounds sodium nitrate and 239.0 pounds potassium nitrate is removed from the reactor A. The reaction mixture is concentrated in concentrator B to drive off 54.2 pounds water and the concentrated mixture then crystallized. 135.9 pounds of crystals consisting of 131.6 pounds potassium nitrate and 4.3 pounds sodium nitrate are removed. The mother liquor in amount of 390 pounds having the composition above noted is recycled through the potassium chloride reactor column A, being admixed for this purpose with the crude potassium chloride feed in the slurry mixer 17.

*Example II*

This example is carried out in equipment of the type shown in FIGURE 2.

94.1 pounds of nitric acid consisting of 63.1 pounds nitric acid and 31.0 pounds water are introduced at a point in column A where the temperature is 0° C. 74.6 pounds of potassium chloride containing trace amounts of sodium chloride and other impurities are introduced into slurry mixer 17. Also introduced into this mixer is the recycle mother liquor stream in amount of 299.9 pounds consisting of 119.6 pounds nitric acid, 79.8 pounds water, 79.5 pounds potassium nitrate and 21.0 pounds sodium nitrate. The resultant mixture enters column A at a point in this column where the temperature is 30° C. The temperature at the base of column A is 117° C., the boiling point of the reaction mixture.

116.4 pounds of a mixture consisting of 38.2 pounds chlorine, 76.8 pounds nitrosyl chloride and 1.4 pounds nitrogen dioxide are taken off overhead from reactor A. This vapor mixture is condensed and divided into two equal streams, one of which is returned as reflux at the top of the column where the temperature is —10° C.

The other stream in amount of 58.2 pounds consisting of 19.1 pounds chlorine, 38.4 pounds nitrosyl chloride and 0.7 pound nitrogen dioxide is mixed with 10.5 pounds of an oxygen mixture (consisting of 10 pounds oxygen and 0.5 pound nitrogen) and this mixture introduced into the liquid phase oxidizer F under a pressure of 390 p.s.i.g. and at a temperature of about 100° C. at its top. There is taken off overhead from the oxidizer F 68.7 pounds consisting of 2 pounds oxygen, 0.5 pound nitrogen, 36.8 pounds chlorine, 5.7 pounds nitrosyl chloride and 23.7 pounds nitrogen dioxide. This mixture enters the chlorine still G where it is fractionated. There is removed as bottoms from this chlorine still 30.9 pounds of a mixture consisting of 1.5 pounds chlorine, 5.7 pounds nitrosyl chloride and 23.7 pounds nitrogen dioxide which is introduced into column A at a point where the temperature is 90° C. 105.9 pounds of chlorine vapor are taken off overhead, condensed and 70.6 pounds of liquid chlorine returned as reflux, and the remaining 35.3 pounds removed as product.

Reaction mixture bottoms in amount of 441.3 pounds consisting of 119.7 pounds nitric acid, 119.8 pounds water, 180.6 pounds potassium nitrate, 21.0 pounds sodium nitrate and 0.2 pound hydrogen chloride are removed from reactor A. This reaction mixture is concentrated in concentrator B to drive off overhead 60.45 pounds of a vapor mixture containing 60 pounds water, 0.3 pound hydrogen chloride and 0.15 pound nitric acid. This vapor mixture is condensed and 20.15 pounds consisting of 20 pounds water, 0.1 pound hydrogen chloride and 0.05 pound nitric acid is returned as reflux. The remainder of the condensate in amount of 40.3 pounds consisting of 40.0 pounds water, 0.2 pound hydrogen chloride, 0.1 pound nitric acid is passed to waste.

The concentrated mixture from the base of concentrator B in amount of 401 pounds consisting of 119.6 pounds nitric acid, 79.8 pounds water, 180.6 pounds potassium nitrate and 21 pounds sodium nitrate is crystallized in crystallizer C. 100.1 pounds of potassium nitrate crystals are recovered. The mother liquor in amount of 299.9 pounds having the composition above noted is recycled through the potassium chloride reactor column A, being admixed for this purpose with the potassium chloride feed in the slurry mixer 17.

It will be noted that the present invention provides a process of converting alkali metal and alkaline earth metal chlorides to the corresponding nitrates, which process can be carried out employing readily available inexpensive nitric acid such as the commercial grades having concentration of 55% to 70% by weight. In that the nitrogen dioxide stream is recycled through the base portion of the reactor and reacted with water and chlorine to produce nitric acid and nitrosyl chloride, the process eliminates the necessity of handling excessive quantities of water and permits the process to be carried out in compact equipment. Furthermore, less fresh acid is required for the production of a unit quantity of potassium nitrate than in heretofore known procedures.

In the process of the present invention, substantially all of the chloride is converted in reactor A to nitrosyl chloride and chlorine. Under the conditions hereinabove disclosed, practically none of the chloride is present in the reaction mixture removed as bottoms from the reactor A. Accordingly, the concentrated reaction mixture introduced into the crystallizer is substantially free of chloride; this minimizes corrosion problems in the handling of the concentrated reaction mixture and the mother liquor.

Since certain changes may be made in carrying out the above described method of converting alkali metal and alkaline earth metal chlorides to the corresponding nitrates without departing from the scope of this invention, it is intended that all matter contained in the above description or shown in the accompanying drawings shall be interpreted as illustrative and not in a limiting sense. Thus while the invention has been described in connection with operations in the potassium chloride reactor and acid concentrator under atmospheric pressure conditions (pressure of about 1 atmosphere at the top of each column), these columns may be operated under pressures of two or three atmospheres or even higher superatmospheric pressures. The temperatures will, of course, be changed correspondingly; the mixtures in the bottoms of these columns are maintained boiling under the pressure conditions existing therein.

What is claimed is:

1. The process of converting a metal chloride from the group consisting of alkali metal and alkaline earth metal chlorides to the corresponding nitrate which comprises reacting nitric acid of 55% to 70% by weight concentration with said metal chloride in the molar proportions of from 1 to 1.4 nitric acid to said metal chloride in a distillation column by flowing the nitric acid and metal chloride counter-current to a rising stream of vapors in said column produced by boiling the reaction mixture, removing reaction mixture from the base of the column and crystallizing metal nitrate therefrom to produce a mother liquor having a concentration of from 50% to 65% by weight nitric acid on a salt-free basis, recycling the said mother liquor through said column, maintaining the upper portion of said column at a temperature such that substantially all of the nitrogen dioxide formed in the reaction remains within said column, removing overhead a vapor stream containing nitrosyl chloride and chlorine and substantially free of nitrogen dioxide, condensing said vapors, and returning as reflux to said upper portion of the column a portion of the condensate thus effecting rectification of the overhead vapor stream.

2. The process as defined in claim 1 in which the fresh nitric acid is introduced into the distillation column where the temperature of the column does not exceed 5° C., the rectification of the vapor mixture in the upper portion of the column is carried out employing from 4 to 8 theroretical plates and the ratio of reflux to net liquid product removed from the column is within the range of from 0.5 to 3.0.

3. The process of converting potassium chloride to potassium nitrate which comprises reacting nitric acid of 55% to 70% by weight concentration with said potassium chloride in the molar proportions of from 1 to 1.4 nitric acid to potassium chloride in a distillation column by flowing the nitric acid and potassium chloride counter-current to a rising stream of vapors in said column produced by boiling the reaction mixture, removing reaction mixture from the base of the column and crystallizing potassium chloride therefrom to produce a mother liquor having a nitric acid concentration of from 50% to 65% by weight on a salt-free basis, recycling the said mother liquor through said column, maintaining the upper portion of said column at a temperature such that substantially all of the nitrogen dioxide formed in the reaction remains within said column, removing overhead a vapor stream containing nitrosyl chloride and chlorine and substantially free of nitrogen dioxide, condensing said vapors, and returning as reflux to said upper portion of the column a portion of the condensate.

4. The process as defined in claim 3 in which the nitrosyl chloride is oxidized to nitrogen dioxide and chlorine and the nitrogen dioxide is introduced into the said column.

5. The process of converting potassium chloride to potassium nitrate which comprises feeding to a distillation column, nitric acid of 58% to 68% concentration by weight and potassium chloride in the molar proportions of about 1 mol of nitric acid per mol of potassium chloride; passing the potassium chloride and nitric acid downwardly through said column counter-current to a rising stream of vapors containing nitrosyl chloride, chlorine and nitrogen dioxide, and heating the reaction mixture to its boiling point near the base of said column; recycling through the lower portion of said column mother liquor obtained from the crystallization of potassium nitrate from the reaction mixture, said mother liquor containing on a salt-free basis from 50% to 65% by weight of nitric acid; introducing into said column at a point below the introduction of the nitric acid a stream of nitrogen dioxide derived from the stream of vapors removed overhead from said column; removing overhead from said column a vapor stream consisting essentially of chlorine and nitrosyl chloride, condensing said vapor stream and returning a portion of the condensate as reflux to maintain the portion of said column where the vapor stream is removed at a temperature of −10° C. to −15° C.; and treating the remainder of said condensate to separate the chlorine from the nitrosyl chloride and oxidizing the nitrosyl chloride to produce the said nitrogen dioxide stream introduced into said column.

6. The process as defined in claim 5 in which the portion of the condensate produced by condensing the vapors taken off overhead from said column is first treated to remove chlorine from the mixture thereof with nitrosyl chloride and the nitrosyl chloride thus separated from the chlorine is oxidized in the liquid phase under pressure to produce the said stream of nitrogen dioxide introduced into said column.

7. The process as defined in claim 5 in which the portion of the condensate produced by condensing the vapors taken off overhead from said column is oxidized in the liquid phase under pressure to produce a stream of nitrogen dioxide and chlorine, the chlorine is separated from the nitrogen dioxide and the nitrogen dioxide is introduced into said column.

8. The process of converting potassium chloride to potassium nitrate which comprises reacting nitric acid of 55% to 70% by weight concentration with said potassium chloride in the molar proportions of about 1 mol of nitric acid per mol of potassium chloride in a distillation column by flowing the nitric acid and potassium chloride counter-current to a rising stream of vapors in said column produced by boiling the reaction mixture, removing reaction mixture from the base of said column and crystallizing potassium nitrate therefrom to produce a mother liquor having a concentration of nitric acid of from 50% to 65% by weight on a salt-free basis, recycling the said mother liquor through said column; introducing the fresh nitric acid at a point in said column where the temperature does not exceed 5° C.; maintaining the upper portion of said column at a temperature of from about −5° to −11° C.; rectifying the vapors in the upper portion of said column by passing the vapors through from 4 to 8 theoretical plates counter-current to a descending stream of reflux produced by removing overhead a vapor stream containing nitrosyl chloride and chlorine and substantially free of nitrogen dioxide, condensing said vapors and returning as reflux from .5 to 3 times the amount of condensate withdrawn, oxidizing the nitrosyl chloride taken off overhead to nitrogen dioxide and chlorine and passing the nitrogen dioxide into the lower portion of the column.

9. The process of converting potassium chloride to potassium nitrate employing a distillation column divided into a lower, intermediate, and top zone, the lower zone containing from 5 to 10 theoretical plates, the intermediate zone containing from 3 to 5 theoretical plates and the top zone containing from 4 to 8 theoretical plates, which process comprises feeding fresh nitric acid of 55% to 70% by weight concentration into the distillation column at a point where the temperature does not exceed about 5° C.; feeding potassium chloride to the column in the molar proportions of about 1 mol of nitric acid per mol of potassium chloride and introducing the potassium chloride at a point below the nitric acid feed and in said intermediate zone; heating the reaction mixture to its boiling point near the base of said column; passing the potassium chloride and nitric acid downwardly through said column counter-current to a rising stream of vapors containing nitrosyl chloride, nitrogen dioxide and chlorine; recycling through the lower zone of said column mother liquor obtained from the crystallization of potassium nitrate from the reaction mixture, said mother liquor containing on a salt-free basis from 50% to 65% by weight of nitric acid; introducing into the lower zone a stream of nitrogen dioxide derived from the stream of vapors removed overhead from said column; removing overhead from said top zone a vapor stream consisting essentially of chlorine and nitrosyl chloride, condensing said vapor stream and returning as reflux from .5 to 3 times the amount of said condensate withdrawn to maintain the portion of said column where the vapor stream is returned at a temperature of −10° C. to −15° C.; and treating the remainder of said condensate to separate the chlorine from the nitrosyl chloride and oxidizing the nitrosyl chloride to produce the said nitrogen dioxide stream introduced into said column.

10. The process of converting potassium chloride to potassium nitrate which comprises feeding to a distillation column nitric acid of 58% to 68% concentration by weight and potassium chloride in the molar proportions of about 1 mol of nitric acid per mol of potassium chloride, the nitric acid being introduced at a point in said column where the temperature is from 5° C. to −5° C. and the potassium chloride being introduced at a point in said column where the temperature is from 5° C. to 60° C.; heating the reaction mixture to its boiling point near the base of said column; recycling through the lower portion of said column mother liquor obtained from the crystallization of potassium nitrate from the reaction mixture, said mother liquor containing on a salt-free basis from 50% to 65% by weight of nitric acid, and being introduced into said column at a point where the temperature is from 5° C. to 60° C.; passing the potassium chloride, mother liquor and nitric acid downwardly through said column counter-current to a rising stream of vapors consisting essentially of nitrosyl chloride, nitrogen dioxide and chlorine; introducing into said column at a point below the point of introduction of the nitric acid a stream of nitrogen dioxide derived from the stream of vapors removed overhead from said column; removing overhead from said column at a point where the temperature is from −10° C. to −15° C. a vapor stream consisting essentially of chlorine and nitrosyl chloride, condensing said vapor stream and returning as reflux to the top of said column from .3 to 3 times the amount of said condensate withdrawn from said column; distilling the condensate withdrawn to drive off overhead the chlorine and thus separate the chlorine from the nitrosyl chloride; and oxidizing the nitrosyl chloride thus separated from the chlorine under superatmospheric pressure and at a temperature within the range of from 80° C. to 120° C. to produce the aforesaid nitrogen dioxide stream which is introduced into said column.

References Cited in the file of this patent

UNITED STATES PATENTS

| 2,092,383 | Tramm et al. | Sept. 7, 1937 |
| 2,181,559 | Beekhuis | Nov. 28, 1939 |
| 2,215,450 | Beekhuis | Sept. 24, 1940 |